United States Patent
Fujimoto (10) Patent No.: US 10,503,151 B2
(45) Date of Patent: Dec. 10, 2019

(54) MACHINING TOOL EQUIPPED WITH DEVICE FOR MONITORING AND CONTROLLING ATMOSPHERE INSIDE MACHINING TOOL CONTROL PANEL

(71) Applicant: FANUC Corporation, Yamanashi (JP)

(72) Inventor: Taisei Fujimoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 773 days.

(21) Appl. No.: 14/855,688

(22) Filed: Sep. 16, 2015

(65) Prior Publication Data
US 2016/0089758 A1 Mar. 31, 2016

(30) Foreign Application Priority Data
Sep. 25, 2014 (JP) ................................. 2014-195688

(51) Int. Cl.
*G05B 19/414* (2006.01)
*G05D 22/00* (2006.01)
(Continued)

(52) U.S. Cl.
CPC ......... *G05B 19/414* (2013.01); *G05B 19/406* (2013.01); *G05B 19/409* (2013.01);
(Continued)

(58) Field of Classification Search
CPC ................ G05B 19/406; G05B 19/414; G05B 2219/37375; G05D 22/00; G05D 23/00; G05D 22/02; G05D 27/02
See application file for complete search history.

(56) References Cited

U.S. PATENT DOCUMENTS 5,900,851 A * 5/1999 Toffolo .................... G09G 3/12
345/36
6,557,771 B2 * 5/2003 Shah .................... F24F 11/0008
236/44 C
(Continued)

FOREIGN PATENT DOCUMENTS

CN 103576604 A 2/2014
CN 103760820 A 4/2014
(Continued)

OTHER PUBLICATIONS

Decision to Grant a Patent in JP Application No. 2014-195688 dated Apr. 4, 2017.
(Continued)

*Primary Examiner* — Jennifer L Norton
(74) *Attorney, Agent, or Firm* — Hauptman Ham, LLP (57) ABSTRACT

A control panel of a machining tool includes a measurement unit measuring a temperature and a humidity involved with an atmosphere inside the control panel, an adjustment unit adjusting the temperature and the humidity, and an atmosphere control unit controlling an atmosphere inside the control panel by controlling the adjustment unit. Since the atmosphere control unit receives electric power supplied from a system separated from a power supply supplying electric power to the machining tool, it is possible to protect various electronic devices inside the control panel by measuring and adjusting the atmosphere inside the control panel even when the machining tool power supply is not turned on.

5 Claims, 6 Drawing Sheets

(51) Int. Cl.
*G05D 23/00* (2006.01)
*G05B 19/409* (2006.01)
*G05D 22/02* (2006.01)
*G05D 23/19* (2006.01)
*G05B 19/406* (2006.01)
*G05D 27/02* (2006.01)

(52) U.S. Cl.
CPC ............ *G05D 22/00* (2013.01); *G05D 22/02* (2013.01); *G05D 23/00* (2013.01); *G05D 23/1919* (2013.01); *G05D 27/02* (2013.01); *G05B 2219/37375* (2013.01)

(56) References Cited

U.S. PATENT DOCUMENTS

| | | | | |
|---|---|---|---|---|
| 7,089,099 | B2* | 8/2006 | Shostak | B60C 23/005 701/29.6 |
| 7,145,560 | B2* | 12/2006 | Woo | G06F 1/203 345/211 |
| 7,516,622 | B2* | 4/2009 | Gauthier | G05D 23/1919 62/157 |
| 8,905,566 | B2* | 12/2014 | Chowdhury | G02B 6/0085 349/62 |
| 8,970,562 | B2* | 3/2015 | Xu | G06F 1/206 345/204 |
| 10,002,514 | B2* | 6/2018 | Sekikawa | G08B 21/20 |
| 2013/0062047 | A1* | 3/2013 | Vaney | H05K 7/20836 165/287 |
| 2019/0081813 | A1* | 3/2019 | Nistane | H04L 12/2816 |

FOREIGN PATENT DOCUMENTS

| | | |
|---|---|---|
| DE | 102006011127 A1 | 9/2007 |
| JP | 3-294904 A | 12/1991 |
| JP | H06-119083 A | 4/1994 |
| JP | 8-263113 A | 10/1996 |
| JP | H09-138044 A | 5/1997 |
| JP | 9-270588 A | 10/1997 |
| JP | 2002-103102 A | 4/2002 |
| JP | 2005-72413 A | 3/2005 |
| JP | 2012-43952 A | 3/2012 |

OTHER PUBLICATIONS

Notification to Grant Patent Right in CN Patent Application No. 201510617779.6, dated Dec. 1, 2017, 7 pp.
Office Action in DE Application No. 10 2015 115 752.7, dated Jun. 11, 2018, 7 pp.

\* cited by examiner

MACHINING TOOL EQUIPPED WITH DEVICE FOR MONITORING AND CONTROLLING ATMOSPHERE INSIDE MACHINING TOOL CONTROL PANEL

RELATED APPLICATIONS

The present application claims priority to Japanese Application Number 2014-195688, filed Sep. 25, 2014, the disclosure of which is hereby incorporated by reference herein in its entirety.

BACKGROUND OF THE INVENTION

1. Field of the Invention

The present invention relates to a machining tool having a function of monitoring and controlling an atmosphere inside a machining tool control panel.

2. Description of the Related Art

A machining tool includes many electronic devices such as a numerical controller and a servo amplifier. However, there are many external failure factors that cause the failure of the electronic devices. Here, oil, oil mist, dust, a chemical liquid, water, and steam are produced as the external failure factors due to a cutting operation or a grinding operation, and exist in the atmosphere around the machining tool. In order to protect the electronic devices from the external failure factors, the electronic devices are received in a locker called a control panel in a general machining tool.

In order to attain the object of protecting the electronic devices from the external failure factors, the control panel needs to be a sealing structure capable of shielding the atmosphere outside the control panel. However, the structure with a high sealing property degrades the maintainability or the workability inside the control panel or degrades the heat radiation performance of the internal device. For this reason, the control panel can not be formed as a complete sealing structure, and hence the influence of the atmosphere outside the control panel needs to be allowed to a certain degree.

In order to solve the above-described problems, for example, a technique of cooling an electronic device disclosed in JP 06-119083 A or a technique of protecting an electronic device by monitoring and controlling a temperature or a humidity inside a control panel disclosed in JP 09-138044 A may be used. If this technique is used, the electronic devices can be protected even when the atmosphere outside the control panel influences the inside of the control panel. Further, when the concentration of oil mist or dust as the external failure factor is further monitored and controlled without monitoring and controlling only the temperature or the humidity, the electronic devices are further protected.

However, the number of interfaces connectable to the peripheral devices of the machining tool is limited. For example, there are many peripheral devices to be connected, such as an automatic door opening/closing device, a machining tool interior lamp, and a cutting liquid pump, in addition to the device for protecting the electronic devices. For that reason, if there are many external failure factors to be monitored and controlled, a problem arises in that the number of empty interfaces for a controller or a necessary sensor is not enough. Further, there is a concern that the external failure factors may intrude into the control panel or influence the inside of the control panel even while the machining tool is not operated. However, it is not possible to protect the electronic devices from the intrusion and the influence of the external failure factors while the machining tool is turned on. As a countermeasure for this problem, a method of controlling the atmosphere by a control system independent from the machining tool can be considered as disclosed in, for example, JP 2002-103102 A. However, in this method, there is no need to worry about the problem in which the number of empty interfaces decreases even when the external failure factors to be monitored and controlled increase in number.

However, in the method of controlling the atmosphere by the control system independent from the machining tool, a problem arises in that the external failure factor to be controlled are handled as a black box. Here, the environment of the machining tool changes depending on the machining tool and the kind or the method of the external failure factor to be monitored and controlled after the machining tool is supplied needs to be adjusted and improved depending on the machining tool. For this reason, it is desirable to visualize the control method or the state of the measured external failure factor. Further, when the convenience in use for a user is considered, it is desirable to integrate a user interface with the machining tool instead of separating the user interface from the machining tool and the external failure factor control system.

SUMMARY OF THE INVENTION

Here, an object of the invention is to provide a machining tool equipped with a device for monitoring and controlling a plurality of failure factors for an atmosphere inside a machining tool control panel by the use of a power supply independent from a machining tool controller, a machining tool, and a communication unit.

A machining tool according to an aspect of the invention includes a control panel housing an electronic device including a machining tool control unit and a user interface unit operating a machining tool.

In a machining tool according to a first aspect of the invention, the control panel includes a temperature measurement unit measuring an atmosphere temperature inside the control panel, a temperature adjustment unit adjusting the atmosphere temperature inside the control panel, a humidity measurement unit measuring an atmosphere humidity inside the control panel, a humidity adjustment unit adjusting the atmosphere humidity inside the control panel, an atmosphere control unit controlling an atmosphere inside the control panel, and an atmosphere-controlling power supply unit supplying electric power to the temperature measurement unit, the humidity measurement unit, the temperature adjustment unit, the humidity adjustment unit, and the atmosphere control unit, independently from a power supply of the machining tool. Then, the atmosphere control unit is connected to the machining tool control unit via a first communication unit so as to communicate with the machining tool control unit, and the atmosphere control unit includes a storage unit storing a temperature command and a humidity command respectively correlated with a temperature and a humidity and a command output unit extracting the temperature command and the humidity command stored in the storage unit based on the temperature and the humidity respectively measured by the temperature measurement unit and the humidity measurement unit so as to output the temperature command and the humidity command. Meanwhile, the user interface unit includes a command change unit connected to the machining tool control unit via a second communication unit so as to check the measured temperature and the measured humidity and to change the temperature command and the humidity command of the atmosphere control unit.

The control panel further may include a concentration measurement unit measuring an oil mist concentration inside the control panel and a concentration adjustment unit adjusting the oil mist concentration inside the control panel. Further, the atmosphere-controlling power supply unit may supply electric power to the concentration measurement unit and the concentration adjustment unit in addition to the temperature measurement unit, the humidity measurement unit, the temperature adjustment unit, the humidity adjustment unit, and the atmosphere control unit. Furthermore, the storage unit may store a temperature command, a humidity command, and an oil mist concentration command respectively correlated with the temperature, the humidity, and the oil mist concentration. Moreover, the command output unit may extract and output the temperature command, the humidity command, and the concentration command stored in the storage unit based on the temperature, the humidity, and the oil mist concentration measured by the temperature measurement unit, the humidity measurement unit, and the concentration measurement unit, and outputs these extracted commands. Here, the control panel further may include a measurement information storage unit storing measurement information measured by the temperature measurement unit, the humidity measurement unit, and the concentration measurement unit. Then, the machining tool control unit may receive the measurement information measured by the temperature measurement unit, the humidity measurement unit, and the concentration measurement unit and store the measurement information in the measurement information storage unit.

The control panel further may include a measurement information storage unit storing measurement information measured by the temperature measurement unit and the humidity measurement unit. Further, the machining tool control unit may receive the measurement information measured by the temperature measurement unit and the humidity measurement unit and store the measurement information in the measurement information storage unit.

In a machining tool according to a second aspect of the invention, the control panel includes a temperature measurement unit measuring an atmosphere temperature inside the control panel, a humidity measurement unit measuring an atmosphere humidity inside the control panel, a ventilation unit ventilating the inside of the control panel, an atmosphere control unit controlling an atmosphere inside the control panel, and an atmosphere-controlling power supply unit supplying electric power to the temperature measurement unit, the humidity measurement unit, the ventilation unit, and the atmosphere control unit, independently from a power supply of the machining tool. Further, the atmosphere control unit is connected to the machining tool control unit via a first communication unit so as to communicate with the machining tool control unit. Furthermore, the atmosphere control unit includes a storage unit storing the ventilation command correlated with the temperature and the humidity and a command output unit extracting the ventilation command stored in the storage unit based on the temperature and the humidity respectively measured by the temperature measurement unit and the humidity measurement unit so as to output the ventilation command. Meanwhile, the user interface unit includes a command change unit connected to the machining tool control unit via a second communication unit so as to check the measured temperature and the measured humidity and to change the ventilation command of the atmosphere control unit.

The control panel further may include a concentration measurement unit measuring an oil mist concentration inside the control panel. Further, the atmosphere-controlling power supply unit may supply electric power to the concentration measurement unit in addition to the temperature measurement unit, the humidity measurement unit, the ventilation unit, and the atmosphere control unit. Furthermore, the storage unit may store a ventilation command correlated with the temperature, the humidity, and the oil mist concentration. Moreover, the command output unit may extract and output the ventilation command stored in the storage unit based on the temperature, the humidity, and the oil mist concentration respectively measured by the temperature measurement unit, the humidity measurement unit, and the concentration measurement unit, and outputs these extracted commands. Here, the control panel further may include a measurement information storage unit storing measurement information measured by the temperature measurement unit, the humidity measurement unit, and the concentration measurement unit. Further, the machining tool control unit may receive the measurement information measured by the temperature measurement unit, the humidity measurement unit, and the concentration measurement unit and store the measurement information in the measurement information storage unit.

The control panel further may include a measurement information storage unit storing measurement information measured by the temperature measurement unit and the humidity measurement unit. Further, the machining tool control unit may receive the measurement information measured by the temperature measurement unit and the humidity measurement unit and store the measurement information in the measurement information storage unit.

In a machining tool according to a third aspect of the invention, the control panel includes a temperature measurement unit measuring an atmosphere temperature inside the control panel, a temperature adjustment unit adjusting an atmosphere temperature inside the control panel, a humidity measurement unit measuring an atmosphere humidity inside the control panel, a humidity adjustment unit adjusting the atmosphere humidity inside the control panel, an atmosphere control unit controlling an atmosphere inside the control panel, and an atmosphere-controlling power supply unit supplying electric power to the temperature measurement unit, the humidity measurement unit, the temperature adjustment unit, the humidity adjustment unit, and the atmosphere control unit, independently from a power supply of the machining tool. Further, the atmosphere control unit is connected to the machining tool control unit via a first communication unit so as to communicate with the machining tool control unit. Furthermore, the atmosphere control unit includes a storage unit storing a temperature command and a humidity command respectively correlated with the temperature and the humidity and a command output unit extracting the temperature command and the humidity command stored in the storage unit based on the temperature and the humidity respectively measured by the temperature measurement unit and the humidity measurement unit so as to output the temperature command and the humidity command. Meanwhile, the user interface unit includes a command change unit connected to the machining tool control unit via a second communication unit and connected to the atmosphere control unit via a third communication unit so as to check the measured temperature and the measured humidity and to change the temperature command and the humidity command of the atmosphere control unit.

According to the invention, it is possible to provide a machining tool equipped with a device for monitoring and controlling a plurality of failure factors by the use of a power supply independent from a machining tool controller, a machining tool, and a communication unit, wherein the user can highly reliably monitor and check the control state of the external failure factor by increasing the number of the external failure factors to be monitored and controlled without increasing the number of the interfaces connectable to the peripheral devices of the machining tool.

BRIEF DESCRIPTION OF THE DRAWINGS

The above and other objects and the features of the present invention will be apparent from the following description of embodiments below with reference to the accompanying drawings, in which.

DETAILED DESCRIPTION OF THE PREFERRED EMBODIMENTS

First, a machining tool according to a first embodiment of the invention will be described with reference to FIG. 1.

The machining tool according to the embodiment includes a control panel 100, a machining tool drive unit 200, and a machining tool power supply 210. The control panel 100 includes a machining tool control unit 110, an atmosphere control unit 120, a temperature measurement unit 130, a temperature adjustment unit 132, a humidity measurement unit 140, a humidity adjustment unit 142, an atmosphere-controlling power supply unit 160, and a user interface unit 170.

The machining tool control unit 110 receives a machining command from a user via the user interface unit 170 or generates a machining command based on a machining program read out from a memory (not shown), controls the machining tool drive unit 200 based on the machining command, and outputs machining information obtained by controlling the machining tool drive unit 200 to the user interface unit 170. The machining tool control unit 110 further receives temperature and humidity command values from the user via the user interface unit 170 so as to output these command values to the atmosphere control unit 120. Meanwhile, the machining tool control unit 110 further receives atmosphere measurement information such as a temperature and a humidity from the atmosphere control unit 120 so as to output the atmosphere measurement information to the user interface unit 170.

The atmosphere control unit 120 includes a storage unit 122 which stores a table obtained by correlating a physical amount representing the atmosphere inside the control panel 100 with a command value for adjusting the atmosphere inside the control panel 100 and a command output unit 124 which extracts the command value stored in the storage unit 122 and outputs the command value to the adjustment units (the temperature adjustment unit 132 and the humidity adjustment unit 142) adjusting the atmosphere.

In the embodiment, the 'atmosphere temperature' and the 'atmosphere humidity' are selected as the physical amount of the atmosphere inside the control panel 100. For that reason, the storage unit 122 stores the temperature command value and the humidity command value respectively correlated with the atmosphere temperature and the atmosphere humidity. As shown in FIG. 1, the temperature command value and the humidity command value are respectively correlated with the atmosphere temperature and the atmosphere humidity every predetermined temperature range and every predetermined humidity range in a table format, and the temperature command value and the humidity command value stored in the storage unit 122 may be extracted based on the temperature information and the humidity information input from the temperature measurement unit 130 which measures the temperature inside the control panel 100 and the humidity measurement unit 140 which measures the humidity inside the control panel 100.

The control panel 100 includes the temperature measurement unit 130 and the humidity measurement unit 140 which respectively measure the atmosphere temperature and the atmosphere humidity inside the control panel 100. The atmosphere control unit 120 extracts the temperature command value and the humidity command value stored in the storage unit 122 based on the temperature information and the humidity information respectively input from the temperature measurement unit 130 and the humidity measurement unit 140. The command output unit 124 generates a temperature command and a humidity command based on the extracted temperature command value and the extracted humidity command value and outputs these commands to the temperature adjustment unit 132 and the humidity adjustment unit 142. In this way, the atmosphere temperature and the atmosphere humidity inside the control panel 100 are adjusted by the temperature adjustment unit 132 and the humidity adjustment unit 142.

Figure 1:
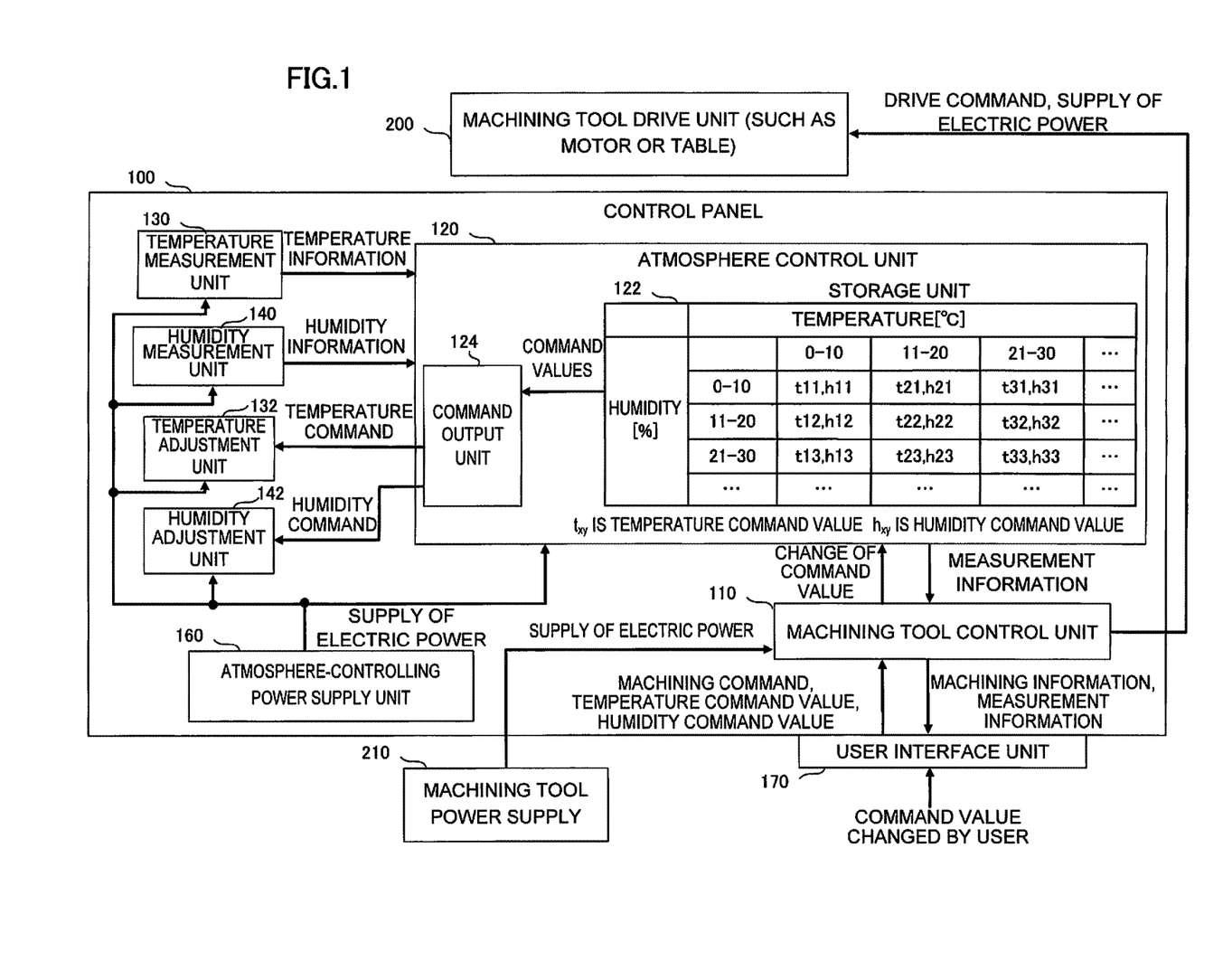
FIG. 1 is a main block diagram illustrating a machining tool according to a first embodiment of the invention.

In addition, the atmosphere temperature and the atmosphere humidity are respectively correlated with the temperature command value and the humidity command value and are stored as the table form in the storage unit 122 shown in FIG. 1, but the correlation is not limited to the example of FIG. 1. For example, in FIG. 1, the temperature command value and the humidity command value are respectively correlated with the atmosphere temperature and the atmosphere humidity while the temperature range and the humidity range are respectively set to 10° C. and 10%. However, there is no need to fix the temperature range and the humidity range. For example, the temperature range and the humidity range can be changed by the temperature zone and the humidity zone. In that case, the temperature range and the humidity range may be set based on the characteristics of the temperature adjustment unit 132 and the humidity adjustment unit 142 or the temperature range and the humidity range may be set based on an experiment or the like. Further, the correlation of the atmosphere temperature and the atmosphere humidity with respect to the temperature command value and the humidity command value is not limited to the table form shown in FIG. 1. For example, the storage unit 122 may store a relational expression for obtaining the temperature command value and the humidity command value from the atmosphere temperature and the atmosphere humidity.

In the atmosphere control unit 120 with such a configuration, when the temperature information and the humidity information are respectively input from the temperature measurement unit 130 and the humidity measurement unit 140 which respectively measure the temperature and the humidity inside the control panel 100, the temperature command value and the humidity command value respectively corresponding to the temperature information and the humidity information are extracted by referring to the table of the storage unit 122 based on the input temperature information and the input humidity information, and the command output unit 124 generates the temperature command and the humidity command based on the extracted temperature command value and the extracted humidity command value. The temperature command and the humidity command which are generated in this way are respectively output to the temperature adjustment unit 132 and the humidity adjustment unit 142, and hence the atmosphere temperature and the atmosphere humidity inside the control panel 100 are adjusted.

The temperature measurement unit 130 and the humidity measurement unit 140 are respectively configured as measurement units which respectively measure the atmosphere temperature and the atmosphere humidity inside the control panel 100, and generate the temperature information and the humidity information so as to output the temperature information and the humidity information to the atmosphere control unit 120. Further, the temperature adjustment unit 132 and the humidity adjustment unit 142 are respectively configured as units having a function of adjusting the atmosphere temperature and the atmosphere humidity inside the control panel 100. For example, the devices include a heat exchanger such as a cooler, a dehumidifier, and a ventilation fan provided in the control panel 100.

The atmosphere-controlling power supply unit 160 is a power supply which supplies electric power to the atmosphere control unit 120, the temperature measurement unit 130, the humidity measurement unit 140, the temperature adjustment unit 132, and the humidity adjustment unit 142, and is provided separately from the machining tool power supply 210 which supplies electric power to the machining tool control unit 110.

The user interface unit 170 includes an input unit (not shown) which is configured as a key, a switch, a mouse, or a touch panel for receiving an operation from the user and a display unit such as a liquid crystal display (not shown) for providing the machining information or the measurement information. By using the user interface unit 170, the user can generate various commands for the machining tool control unit 110 or the atmosphere control unit 120 via the input unit and can check the information on the machining tool or the control panel via the display unit.

In the control panel 100 with the above-described configuration, the atmosphere-controlling power supply unit 160 which supplies electric power to the atmosphere control unit 120 is provided separately from the machining tool power supply 210 which supplies electric power to the machining tool control unit 110 as described above. For this reason, the atmosphere inside the control panel can be measured and adjusted even when the machining tool power supply 210 is not turned on, that is, the machining tool is not operated.

Next, a machining tool according to a second embodiment of the invention will be described with reference to FIG. 2.

In the first embodiment (FIG. 1), the atmosphere temperature and the atmosphere humidity inside the control panel 100 are measured and the temperature command value and the humidity command value for adjusting the atmosphere temperature and the atmosphere humidity inside the control panel 100 are set based on the measured atmosphere temperature and the measured atmosphere humidity. However, in the second embodiment, the oil mist concentration inside the control panel 100 is measured in addition to the atmosphere temperature and the atmosphere humidity, and the oil mist concentration is adjusted based on the measurement result.

The machining tool according to the embodiment includes a concentration measurement unit 150 which measures the oil mist concentration inside the control panel 100 and a concentration adjustment unit 152 which adjusts the oil mist concentration inside the control panel 100 in addition to the configuration of the machining tool of the first embodiment.

The concentration measurement unit 150 is configured as a piezo balance type dust measurement unit which is provided inside the control panel 100, and generates oil mist concentration information based on the measured oil mist concentration so as to output the oil mist concentration information to the atmosphere control unit 120. The concentration adjustment unit 152 is configured as an air filter which filters air inside the control panel 100, and receives the oil mist concentration command from the atmosphere control unit 120 so as to adjust the oil mist concentration inside the control panel 100.

Further, the temperature command value, the humidity command value, and the oil mist concentration command value are respectively correlated with the atmosphere temperature, the atmosphere humidity, and the oil mist concentration and are stored in a table format in the storage unit 122 of the atmosphere control unit 120. In FIG. 2, the temperature command value, the humidity command value, and the oil mist concentration command value are respectively correlated with the atmosphere temperature, the atmosphere humidity, and the oil mist concentration every predetermined temperature range, every predetermined humidity range, and every predetermined oil mist concentration range, and the temperature command value, the humidity command value, and the oil mist concentration command value stored in the storage unit 122 are extracted based on the temperature information, the humidity information, and the oil mist concentration information input from the temperature measurement unit 130, the humidity measurement unit 140, and the concentration measurement unit 150 which respectively measure the temperature, the humidity, and the oil mist concentration inside the control panel 100.

Then, the atmosphere control unit 120 extracts the temperature command value, the humidity command value, and the oil mist concentration command value stored in the storage unit 122 based on the temperature information, the humidity information, and the oil mist concentration information input from the temperature measurement unit 130, the humidity measurement unit 140, and the concentration measurement unit 150. The command output unit 124 generates the temperature command, the humidity command, and the oil mist concentration command based on the extracted temperature command value, the extracted humidity command value, and the extracted oil mist concentration command value, and outputs the temperature command, the humidity command, and the oil mist concentration command to the temperature adjustment unit 132, the humidity adjustment unit 142, and the concentration adjustment unit 152. In this way, the atmosphere temperature, the atmosphere humidity, and the oil mist concentration inside the control panel 100 are adjusted by the temperature adjustment unit 132, the humidity adjustment unit 142, and the concentration adjustment unit 152.

Figure 2:
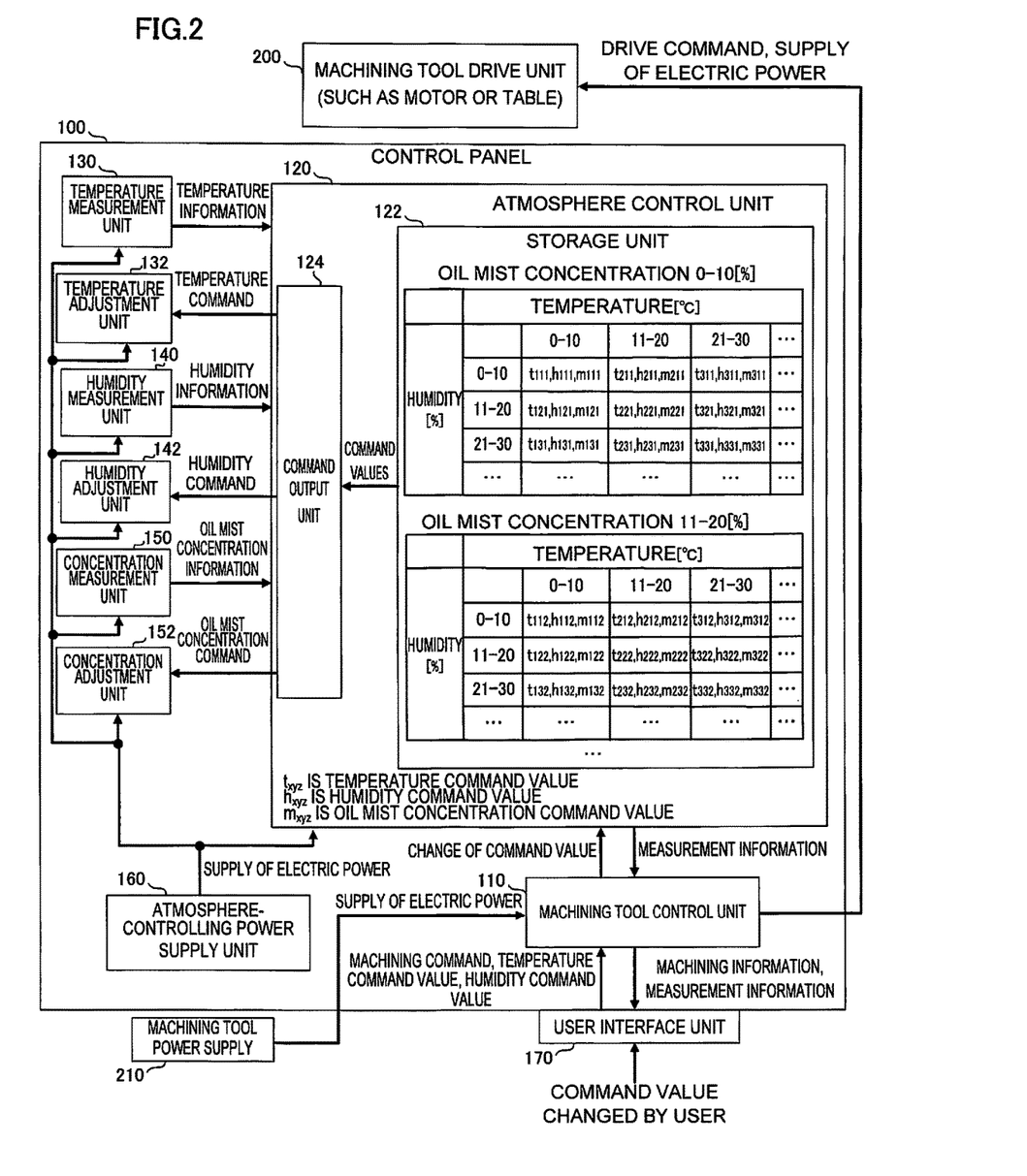
FIG. 2 is a main block diagram illustrating a machining tool according to a second embodiment of the invention.

In addition, the temperature command value, the humidity command value, and the oil mist concentration command value are respectively correlated with the atmosphere temperature, the atmosphere humidity, and the oil mist concentration and are stored in a table format in the storage unit 122 shown in FIG. 2, but the correlation is not limited to the example of FIG. 2. For example, in FIG. 2, the temperature command value, the humidity command value, and the oil mist concentration command value are respectively correlated with the atmosphere temperature, the atmosphere humidity, and the oil mist concentration while the temperature range, the humidity range, and the oil mist concentration range are respectively set to 10° C., 10%, and 10%. However, there is no need to fix the temperature range, the humidity range, and the oil mist concentration range. For example, the temperature range, the humidity range, and the oil mist concentration range may be changed according to the temperature zone, the humidity zone, and the oil mist concentration zone. In that case, the temperature range, the humidity range, and the oil mist concentration range may be set based on the characteristics of the temperature adjustment unit 132, the humidity adjustment unit 142, and the concentration adjustment unit 152 or the temperature range, the humidity range, and the oil mist concentration range may be set based on an experiment or the like. Further, the invention is not limited to the table form shown in FIG. 2. For example, the storage unit 122 may store a relational expression for obtaining the temperature command value, the humidity command value, and the oil mist concentration command value from the atmosphere temperature, the atmosphere humidity, and the oil mist concentration.

In the case of the control panel 100 with the above-described configuration, in addition to the advantage of the control panel 100 described in the first embodiment, the oil mist concentration inside the control panel can be adjusted even when the machining tool power supply is not turned on, that is, when the machining tool is not operated.

Next, a machining tool according to a third embodiment of the invention will be described with reference to FIG. 3.

In the first embodiment (FIG. 1), the atmosphere temperature and the atmosphere humidity inside the control panel 100 are measured and the temperature command value and the humidity command value for adjusting the atmosphere temperature and the atmosphere humidity inside the control panel 100 are set based on the measured atmosphere temperature and the measured atmosphere humidity. However, in the third embodiment, a ventilation unit 180 is provided so as to adjust the atmosphere temperature and the atmosphere humidity inside the control panel 100.

The machining tool according to the embodiment includes the ventilation unit 180 which ventilates the air inside the control panel 100, instead of the temperature adjustment unit 132 and the humidity adjustment unit 142 of the first embodiment (FIG. 1). The ventilation unit 180 is provided in the outer wall of the control panel, and includes an inlet port provided with a filter and a fan provided in an outlet port. The ventilation unit receives a ventilation command from the atmosphere control unit 120, and ventilates the air inside the control panel 100 by controlling, for example, the rotation speed of the fan so as to adjust the temperature and the humidity inside the control panel 100.

Figure 3:
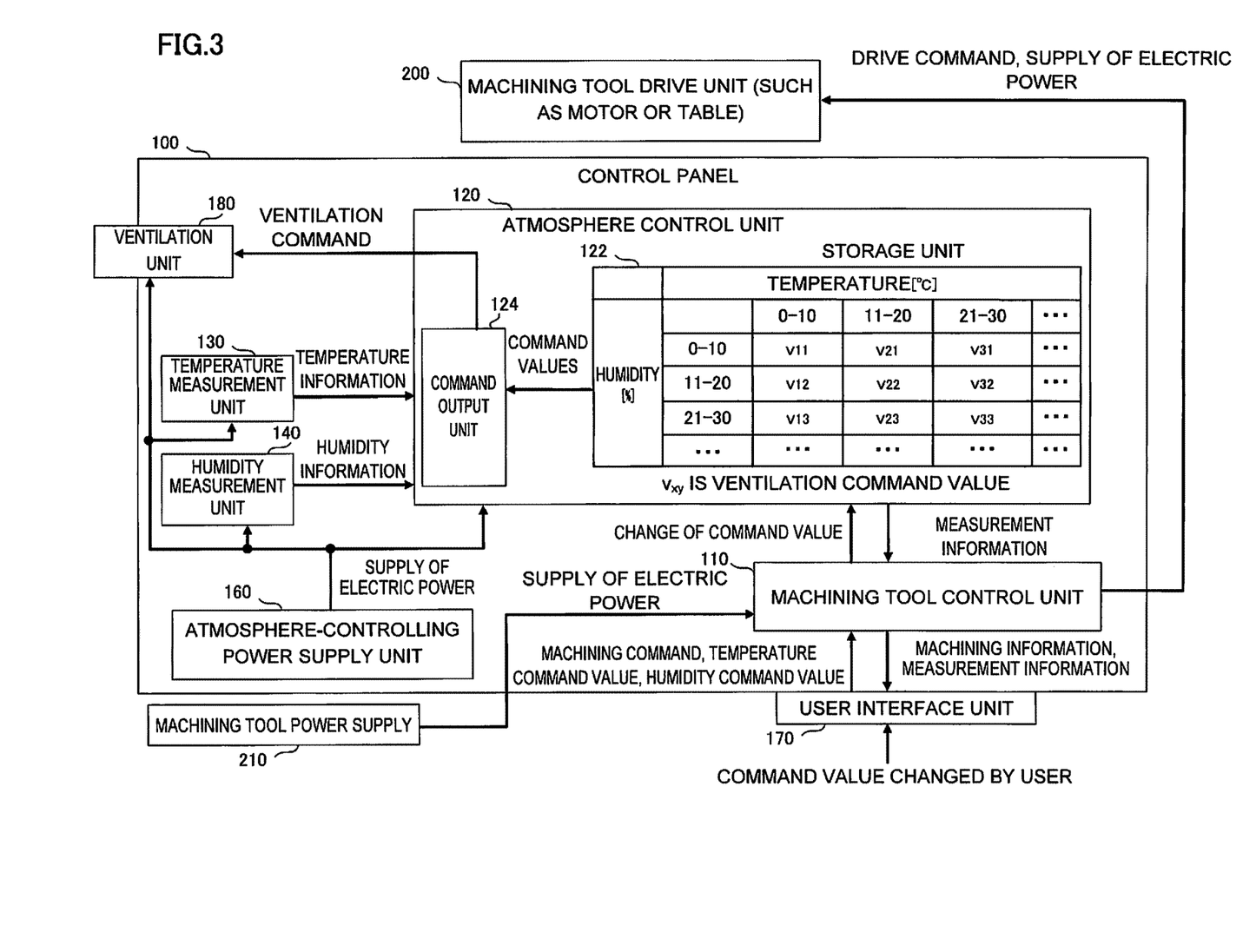
FIG. 3 is a main block diagram illustrating a machining tool according to a third embodiment of the invention.

Further, as shown in FIG. 3, the ventilation command value is correlated with the atmosphere temperature and the atmosphere humidity and is stored in a table format in the storage unit 122 of the atmosphere control unit 120. In FIG. 3, the ventilation command value is correlated with the atmosphere temperature and the atmosphere humidity every predetermined temperature range and every predetermined humidity range and is stored in a table format. Thus, the ventilation command value stored in the storage unit 122 can be extracted based on the temperature information and the humidity information which are respectively input from the temperature measurement unit 130 and the humidity measurement unit 140 which respectively measure the temperature and the humidity inside the control panel 100.

The atmosphere control unit 120 extracts the ventilation command value stored in the storage unit 122 based on the temperature information and the humidity information input from the temperature measurement unit 130 and the humidity measurement unit 140. The command output unit 124 generates a ventilation command based on the extracted ventilation command value so as to output the ventilation command to the ventilation unit 180. When the air inside the control panel 100 is ventilated in this way, the atmosphere temperature and the atmosphere humidity are adjusted by the ventilation unit 180. The other configurations are the same as those of the first embodiment.

Next, a machining tool according to a fourth embodiment of the invention will be described with reference to FIG. 4.

In the second embodiment (FIG. 2), the atmosphere temperature, the atmosphere humidity, and the oil mist concentration inside the control panel 100 are measured, and the temperature command value, the humidity command value, and the oil mist concentration command value are set so as to adjust the atmosphere temperature, the atmosphere humidity, and the oil mist concentration inside the control panel 100 based on the measured atmosphere temperature, the measured atmosphere humidity, and the measured oil mist concentration. However, in the fourth embodiment, a ventilation unit is provided so as to adjust the atmosphere temperature, the atmosphere humidity, and the oil mist concentration inside the control panel 100.

The machining tool according to the embodiment includes a ventilation unit 180 which ventilates the air inside the control panel 100 instead of the temperature adjustment unit 132, the humidity adjustment unit 142, and the concentration adjustment unit 152 of the second embodiment (FIG. 2). The ventilation unit 180 is provided on the outer wall of the control panel, and includes an inlet port provided with a filter and a fan provided in an outlet port. The ventilation unit receives a ventilation command from the atmosphere control unit 120, and ventilates the air inside the control panel 100 by controlling, for example, the rotation speed of the fan so as to adjust the temperature, the humidity, and the oil mist concentration inside the control panel 100.

Figure 4:
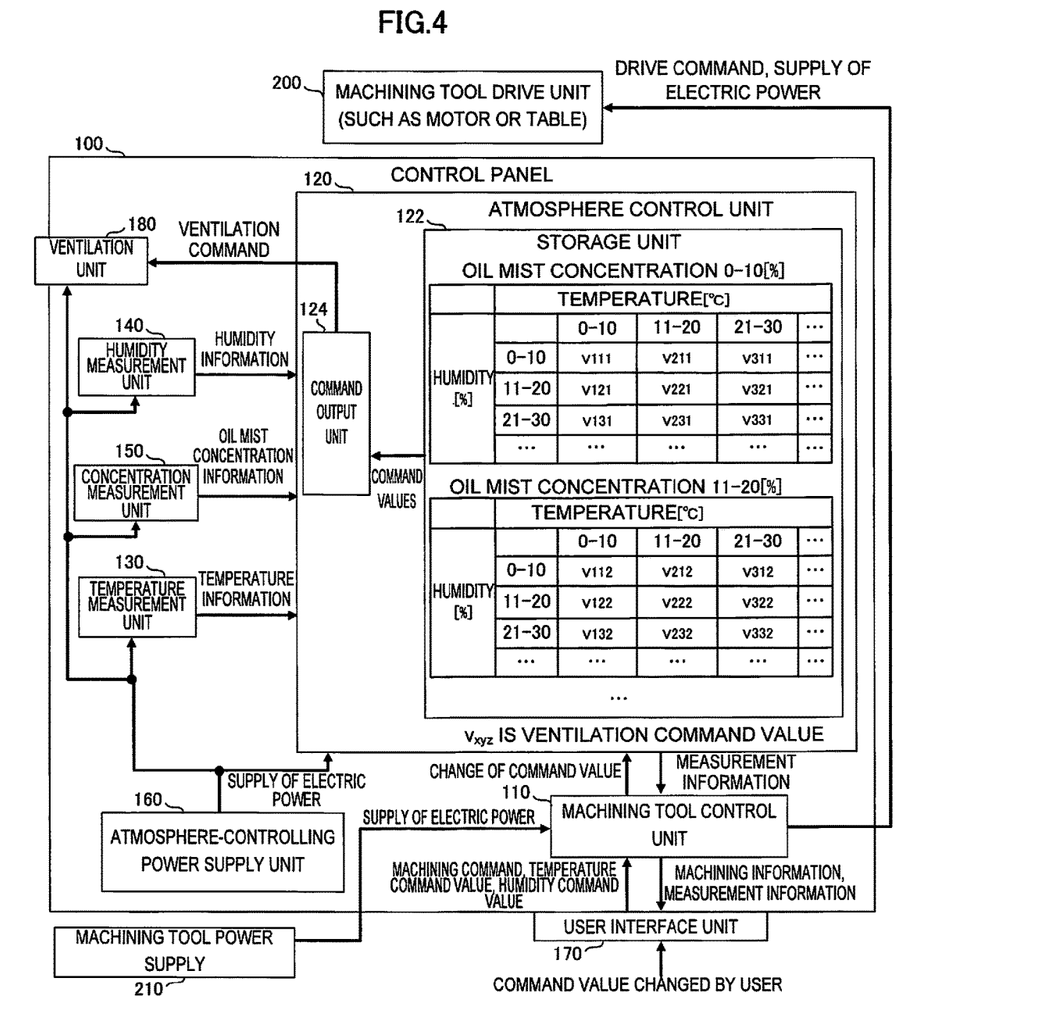
FIG. 4 is a main block diagram illustrating a machining tool according to a fourth embodiment of the invention.

Further, as shown in FIG. 4, the ventilation command value is correlated with the atmosphere temperature, the atmosphere humidity, and the oil mist concentration and is stored in a table format in the storage unit 122 of the atmosphere control unit 120. In FIG. 4, the ventilation command value is correlated with the atmosphere temperature, the atmosphere humidity, and the oil mist concentration every predetermined temperature range, every predetermined humidity range, and every predetermined oil mist concentration range and the ventilation command value stored in the storage unit 122 is extracted based on the temperature information, the humidity information, and the oil mist concentration information respectively input from the temperature measurement unit 130, the humidity measurement unit 140, and the concentration measurement unit 150 which respectively measure the temperature, the humidity, and the oil mist concentration inside the control panel 100.

The atmosphere control unit 120 extracts the ventilation command value based on the temperature information, the humidity information, and the concentration information input from the temperature measurement unit 130, the humidity measurement unit 140, and the concentration measurement unit 150. The command output unit 124 generates a ventilation command based on the extracted ventilation command value so as to output the ventilation command to the ventilation unit 180. When the air inside the control panel 100 is ventilated in this way, the atmosphere temperature, the atmosphere humidity, and the oil mist concentration are adjusted. The other configurations are the same as those of the second embodiment.

Figure 5:
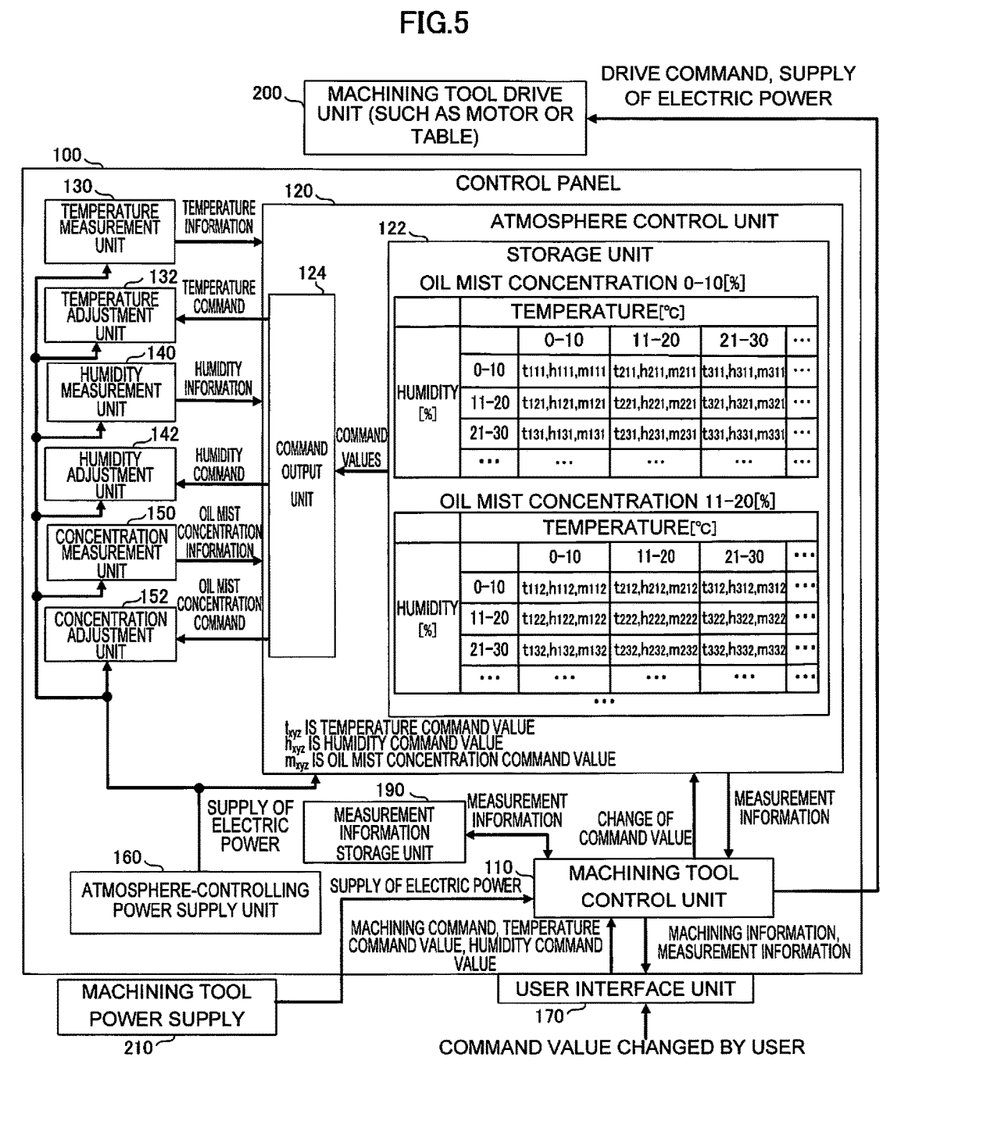
FIG. 5 is a main block diagram illustrating a machining tool according to a fifth embodiment of the invention.

Next, a machining tool according to a fifth embodiment of the invention will be described with reference to FIG. 5.

In the second embodiment (FIG. 2), the atmosphere temperature, the atmosphere humidity, and the oil mist concentration inside the control panel 100 are measured, and the temperature command value, the humidity command value, and the oil mist concentration command value are set so as to adjust the atmosphere temperature, the atmosphere humidity, and the oil mist concentration inside the control panel 100 based on the measured atmosphere temperature, the measured atmosphere humidity, and the measured oil mist concentration. However, in the fifth embodiment, a configuration of recording each of the measured atmosphere temperature, the measured atmosphere humidity, and the measured oil mist concentration is provided.

The machining tool according to the embodiment includes a measurement information recording unit 190, in addition to the configuration of the machining tool of the second embodiment (FIG. 2). The measurement information recording unit 190 stores the measurement information on the atmosphere temperature, the atmosphere humidity, and the oil mist concentration inside the control panel 100 which are measured by the temperature measurement unit 130, the humidity measurement unit 140, and the concentration measurement unit 150.

The measurement information recording unit 190 is connected to the machining tool control unit 110, and receives the measurement information (the temperature information, the humidity information, and the oil mist concentration information) transmitted from the machining tool control unit 110 so as to record the measurement information on a memory (not shown). Here, the measurement information is transmitted from the atmosphere control unit 120 to the machining tool control unit 110. The measurement information recorded in the memory can be checked while being read and displayed at an appropriate timing when the user operates the user interface unit 170. Further, the measurement information can be stored in an external storage medium via an interface (not shown) and may be used to analyze the state of the machining tool. The other configurations are the same as those of the other embodiments.

In the control panel 100 with the above-described configuration, various measurement information involved with the atmosphere of the control panel 100 can be stored, in addition to the advantages of the control panel 100 described in the above-described embodiments, and hence these information can be used for various purposes.

Then, the atmosphere control unit 120 extracts the temperature command value, the humidity command value, and the oil mist concentration command value stored in the storage unit 122 based on the temperature information, the humidity information, and the oil mist concentration information input from the temperature measurement unit 130, the humidity measurement unit 140, and the concentration measurement unit 152. The command output unit 124 generates the temperature command, the humidity command, and the oil mist concentration command based on the extracted temperature command value, the extracted humidity command value, and the extracted oil mist concentration command value, and outputs the temperature command, the humidity command, and the oil mist concentration command to the temperature adjustment unit 132, the humidity adjustment unit 142, and the concentration adjustment unit 152. In this way, the atmosphere temperature, the atmosphere humidity, and the oil mist concentration inside the control panel 100 are adjusted by the temperature adjustment unit 132, the humidity adjustment unit 142, and the concentration adjustment unit 152. The other configurations are the same as those of the second embodiment.

Figure 6:
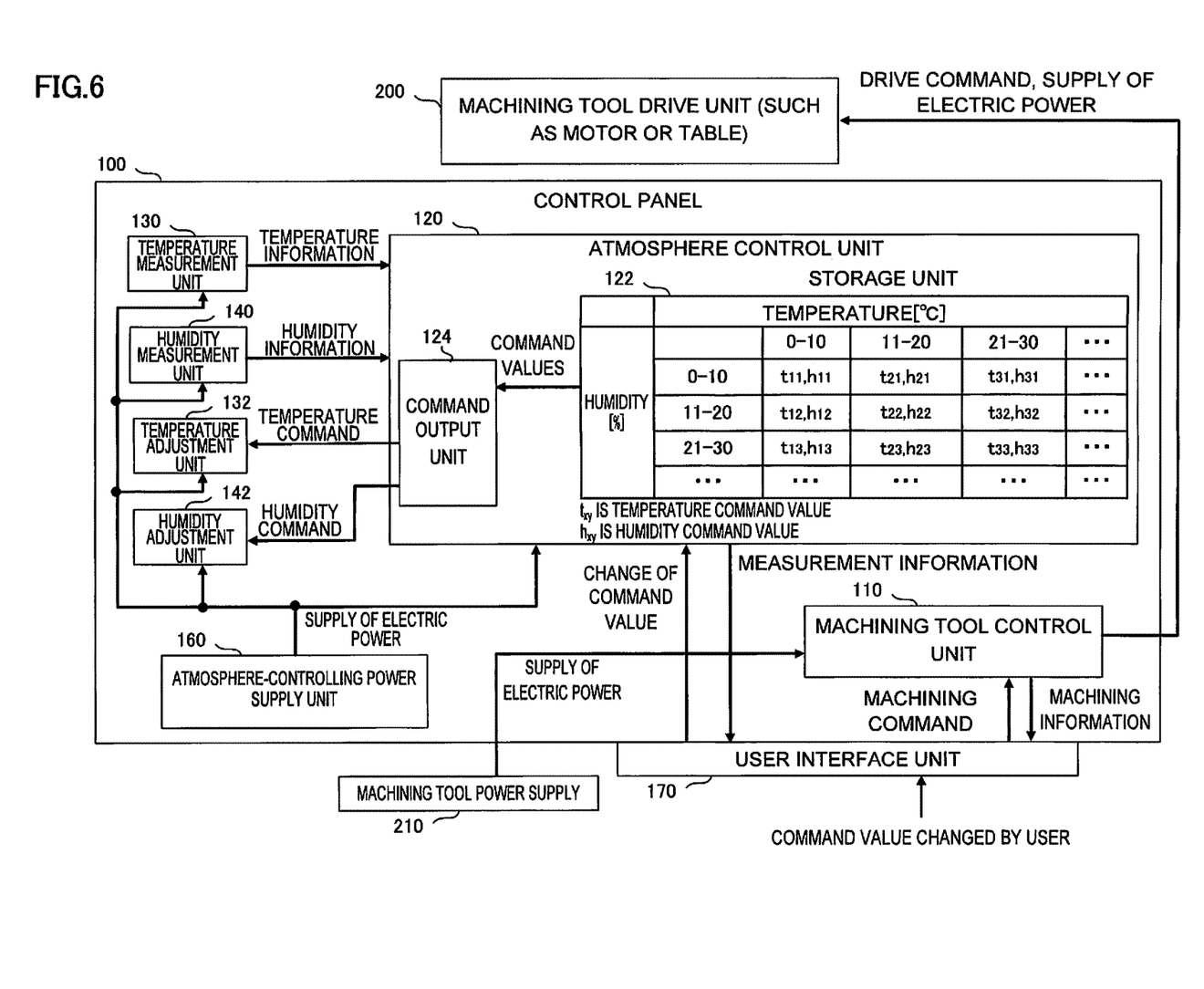
FIG. 6 is a main block diagram illustrating a machining tool according to a sixth embodiment of the invention.

Next, a machining tool according to a sixth embodiment of the invention will be described with reference to FIG. 6.

In the first embodiment (FIG. 1), the user interface unit 170 is connected to the atmosphere control unit 120 via the machining tool control unit 110. However, in the embodiment, the user interface unit 170 is directly connected to the machining tool control unit 110 and the atmosphere control unit 120 (that is, without interposing the machining tool control unit 110 therebetween).

In the machining tool according to the embodiment, in addition to the configuration of the machining tool of the first embodiment, the communication line between the user interface unit 170 and the machining tool control unit 110 and the communication line between the user interface unit 170 and the atmosphere control unit 120 are provided separately.

Each of those two communication lines is formed of a bus constituting an input/output interface, and the user interface unit 170 is configured to separately control a display command input from the communication lines and an operation command output to the respective communication lines. The user interface unit 170 may include an operation unit and a display unit dedicated for each communication line in terms of hardware or software or may control the input/output by switching the communication line.

With such a configuration, the user may instruct the atmosphere control unit 120 to change the command value through the operation of the user interface unit 170 and can check the atmosphere temperature and the atmosphere humidity inside the control panel 100 by displaying the atmosphere temperature and the atmosphere humidity on the user interface unit 170 even when the machining tool power supply is stopped.

The invention claimed is:

1. A machining tool, comprising:
   a control panel housing an electronic device including a machining tool controller; and
   a user interface operating the machining tool,
   wherein the control panel includes
      a temperature sensor measuring an atmosphere temperature inside the control panel;
      a temperature adjustment unit adjusting the atmosphere temperature inside the control panel,
      a humidity sensor measuring an atmosphere humidity inside the control panel,
      a humidity adjustment unit adjusting the atmosphere humidity inside the control panel,
      an atmosphere controller controlling an atmosphere inside the control panel, and
      an atmosphere-controlling power supply supplying electric power to the temperature sensor, the humidity sensor, the temperature adjustment unit, the humidity adjustment unit, and the atmosphere controller, independently from a power supply of the machining tool, wherein the atmosphere controller is connected to the machining tool controller to communicate with the machining tool controller, wherein the atmosphere controller includes
- a storage storing a temperature command and a humidity command respectively correlated with a temperature and a humidity, and
- a command output unit extracting the temperature command and the humidity command stored in the storage based on the temperature and the humidity respectively measured by the temperature sensor and the humidity sensor to output the extracted temperature command and the extracted humidity command, and wherein the user interface is connected to the machining tool controller via a first communication line to check the measured temperature and the measured humidity and to change the temperature command and the humidity command of the atmosphere controller.

2. The machining tool according to claim 1, wherein the control panel further includes a concentration sensor measuring an oil mist concentration inside the control panel and a concentration adjustment unit adjusting the oil mist concentration inside the control panel, wherein the atmosphere-controlling power supply further supplies electric power to the concentration sensor and the concentration adjustment unit in addition to the temperature sensor, the humidity sensor, the temperature adjustment unit, the humidity adjustment unit, and the atmosphere controller, wherein the storage stores the temperature command, the humidity command, and an oil mist concentration command respectively correlated with the temperature, the humidity, and the oil mist concentration, and wherein the command output unit extracts the temperature command, the humidity command, and the concentration command stored in the storage based on the temperature, the humidity, and the oil mist concentration measured by the temperature sensor, the humidity sensor, and the concentration sensor, and outputs these extracted commands.

3. The machining tool according to claim 1, wherein the control panel further includes a measurement information storage storing measurement information measured by the temperature sensor and the humidity sensor, and wherein the machining tool controller receives the measurement information measured by the temperature sensor and the humidity sensor and stores the measurement information in the measurement information storage.

4. The machining tool according to claim 2, wherein the control panel further includes a measurement information storage storing measurement information measured by the temperature sensor, the humidity sensor, and the concentration sensor, and wherein the machining tool controller receives the measurement information measured by the temperature sensor, the humidity sensor, and the concentration sensor and stores the measurement information in the measurement information storage.

5. The machining tool according to claim 1, wherein the user interface is connected to the machining tool controller via the first communication line and connected to the atmosphere controller via a second communication line to check the measured temperature and the measured humidity and to change the temperature command and the humidity command of the atmosphere controller.

* * * * *